US00RE36039E

United States Patent [19]

Hillstrom et al.

[11] E Patent Number: Re. 36,039

[45] Reissued Date of Patent: Jan. 12, 1999

[54] ILLUMINATED CANOPY SYSTEM

[75] Inventors: David U. Hillstrom, Novi; Brian J. Hillstrom, Milford, both of Mich.

[73] Assignee: Marketing Displays, Inc., Farmington Hills, Mich.

[21] Appl. No.: 564,738

[22] Filed: Nov. 29, 1995

Related U.S. Patent Documents

Reissue of:

[64] Patent No.: 5,381,324
Issued: Jan. 10, 1995
Appl. No.: 996,103
Filed: Dec. 23, 1992

[51] Int. Cl.[6] ..... F21P 1/02; G09F 13/04

[52] U.S. Cl. ..... 362/362; 362/145; 362/240; 362/243; 362/246; 362/278; 362/320; 362/374; 362/812; 40/577; 40/603

[58] Field of Search ..... 362/145, 151, 362/152, 223, 225, 240, 242–244, 246, 249, 278, 320, 330, 343, 355–357, 361, 362, 367, 368, 374, 812; 40/564, 577, 603, 604

[56] References Cited

U.S. PATENT DOCUMENTS

| | | | |
|---|---|---|---|
| 1,686,615 | 10/1928 | Balnojan | 40/433 |
| 2,058,058 | 10/1936 | Caccia | 40/577 |
| 2,141,139 | 12/1938 | Howe et al. | 40/563 |
| 2,559,991 | 7/1951 | Owen | 40/545 |
| 2,588,545 | 3/1952 | Lawrence | 40/716 |
| 3,064,121 | 11/1962 | Greene | 362/225 |
| 3,296,431 | 1/1967 | Green | 40/570 |
| 3,419,986 | 1/1969 | Maze | 40/564 |
| 4,240,220 | 12/1980 | Smith | 40/564 |
| 4,267,489 | 5/1981 | Morohashi | 40/361 |
| 4,430,819 | 2/1984 | Chandler | 40/564 |
| 4,452,000 | 6/1984 | Gandy | 40/574 |
| 4,512,098 | 4/1985 | Ready et al. | 40/610 |
| 4,802,296 | 2/1989 | Kovalak, Jr. | 40/607 |
| 4,817,317 | 4/1989 | Kovalak, Jr. | 40/603 |
| 5,006,966 | 4/1991 | Mikalonis | 362/74 |
| 5,020,252 | 6/1991 | De Boef | 40/564 |
| 5,044,102 | 9/1991 | Finch et al. | 40/603 |
| 5,188,453 | 2/1993 | Subisak et al. | 362/329 |

FOREIGN PATENT DOCUMENTS

| | | | |
|---|---|---|---|
| 721217 | 3/1932 | France | 362/812 |

OTHER PUBLICATIONS

Citgo Specification and Assembly Instructions for "Hi–Rise Signs/Poles" Rev. Jan. 1993).
Drawing 6012: Cantilever Spreader Bar Nov. 1988.
Young Electric Sign Co. Drawing 88–1451–1 (Apr. 1989).
Young Electric Sign Co. Drawing 88–1451–2 (Apr. 1989).
Young Electric Sign Co. Drawing 88–1451–3 (Apr. 1989).
Young Electric Sign Co. Drawing 88–1451–4 (Apr. 1989).
Young Electric Sign Co. Drawing 88–1451–5 (Apr. 1989).
Bethel Corporation Drawing 90299D (Dec. 1990; Revised Jan. 1991).
Untitled (but probably Bethel Corp.) 90299C (Dec. 1990; Revised Jan. 1991).
4 Drawings by Vacufoam Industry for "Wendy's" signs (Drawing Nos. 840178 and 840178R) (Nov. 1990).
Young Electric Sign Co. Drawing 88–1451–1 (Nov. 1988).
Zimmerman Sign Co. Drawing FLJ–0–000 (Oct. 1990).
Holiday Inns, Inc. Drawing M–10(?) (Nov. 1982).

*Primary Examiner*—Alan Cariaso

[57] ABSTRACT

A rear illuminated fascia apparatus for mounting on a surface is disclosed. The apparatus has a support structure comprising support brackets, top and bottom edge frame members, and corner members which tension and hold in place a flexible, translucent sheet material. Metal halide lights are used to illuminate the sheet material. A light dispersion member is positioned between the lights and the sheet material to uniformly distribute and disperse the light through the sheet material. Access members in the apparatus and access openings in the light dispersion member allow convenient changes of the lights.

69 Claims, 7 Drawing Sheets

ILLUMINATED CANOPY SYSTEM

Matter enclosed in heavy brackets [ ] appears in the original patent but forms no part of this reissue specification; matter printed in italics indicates the additions made by reissue.

TECHNICAL FIELD

The present invention relates to lighted canopy and wall systems, particularly for gasoline service stations and other business establishments. The fascias of the canopies have transparent displays which are illuminated from the rear for visibility and aesthetics. Similarly, back-lit lightboxes are mounted on the buildings.

BACKGROUND OF THE INVENTION

Businesses with outdoor service areas, such as gasoline service stations, are taking steps today to improve the facilities and areas around them. The companies want to keep their places of business attractive for customers, keep the appearances on par with other businesses, and also make the facilities better illuminated and safer in non-daylight hours.

Service stations in particular today are improving the areas around their buildings and gasoline pumps by providing increased lighting and more aesthetic and efficient structures. In particular, illuminated and aesthetic protective canopies are being installed over the gasoline pumps. Many of these canopies have signs, lights, or lighted faces along their fascias. In addition, wall mounted signs are also being installed on the buildings or surrounding structures. Many of these signs are also lighted for increased visibility.

Where the canopy fascias and wall signs are illuminated, one of the difficulties has been to create a uniform light distribution on the outer (visible) surfaces. Typically, fluorescent bulbs (used internally) or spotlights (externally) are used and these types of illumination provide uneven or nonuniform light distribution. Also, the fluorescent lights which are often 6, 8 or 10 feet in length are difficult to change when they burn out. Changing burned out lights in conventional illuminated canopy and fascia systems is an expensive and time-consuming task, often requiring a boom truck or extension ladder. Moreover, it is often necessary to dismantle a portion of the canopy or fascia apparatus in order to change the lights.

Another difficulty with known canopy fascia systems as well as wall-mounted signs, concerns the quality and integrity of the sign panels. Weather conditions and changes in temperature sometimes create ripples and waves in the sign panels reducing their effectiveness and attractiveness. The durability of some types of sign panels has not been sufficient.

Another problem with known illuminated canopy and fascia systems, as well as wall-mounted signs, concerns the corner intersections between adjacent surfaces. Some systems have had difficulty creating a uniform light pattern at these corners. Creating a smooth wrinkle-free surface at the corners and a clean edge is also a problem with some systems.

It is an object of the present invention to provide illuminated canopy and wall-mounted systems, particularly for service stations, which are improvements over known systems. It is another object of the present invention to provide illuminated canopy and wall-mounted systems which distribute the light uniformly on and through the display faces of the systems.

It is also an object of the invention to provide illuminated canopy and wall-mounted systems in which the light sources are easy to change and maintain. It is still another object of the invention to provide illuminated canopy and wall-mounted systems which are more energy efficient than known systems today, have improved lighting and have reduced cost for use and maintenance. An additional object of the invention is to provide illuminated canopy and wall-mounted systems which have improved illumination and aesthetics at the corners of adjacent panels.

These and other objects, features and advantages of the invention will become apparent from the following description of the invention and appended claims, when viewed in accordance with the attached drawings.

SUMMARY OF THE INVENTION

The present invention provides improved illuminated canopy and wall-mounted systems for business establishments, such as service stations. The systems can be installed over existing fascias on the canopy and/or on wall surfaces of the building. A "light box" is provided having supporting brackets connected to a rear panel member or wall surface. A decorated flexible sheet member is stretched across the face of each of the lightboxes and held in place by extrusions which tension the sheet material. A plurality of lights (preferably metal halide lights) are provided in the light boxes. A light dispersion film is placed over the light sources in order to distribute the light uniformly on the face of the sign panel. Trim caps are provided on the top and bottom of the lighting apparatus to form an enclosed structure and make it weatherproof where necessary.

Hinged access doors or removable panels are provided in the bottom of each of the structures adjacent the lights. The access members allow replacement of the lights either manually or with a conventional tool. Also, for this purpose, an opening can be provided in the light dispersion film or the film can be selectively detachable.

A curved clear plastic member is provided under the dispersion film for support. The support also has an opening in it to allow changing of the lights where necessary. Self-drilling screws are used to attach various parts together which allow a less expensive and faster method for assembly.

An improved corner assembly for the lightbox structures is also provided. Spring metal tensioning members are used to hold the flexible front film in place under tension, and yet do not block the light from reaching the corners.

BEST MODE(S) FOR CARRYING OUT THE INVENTION

Figure 1:
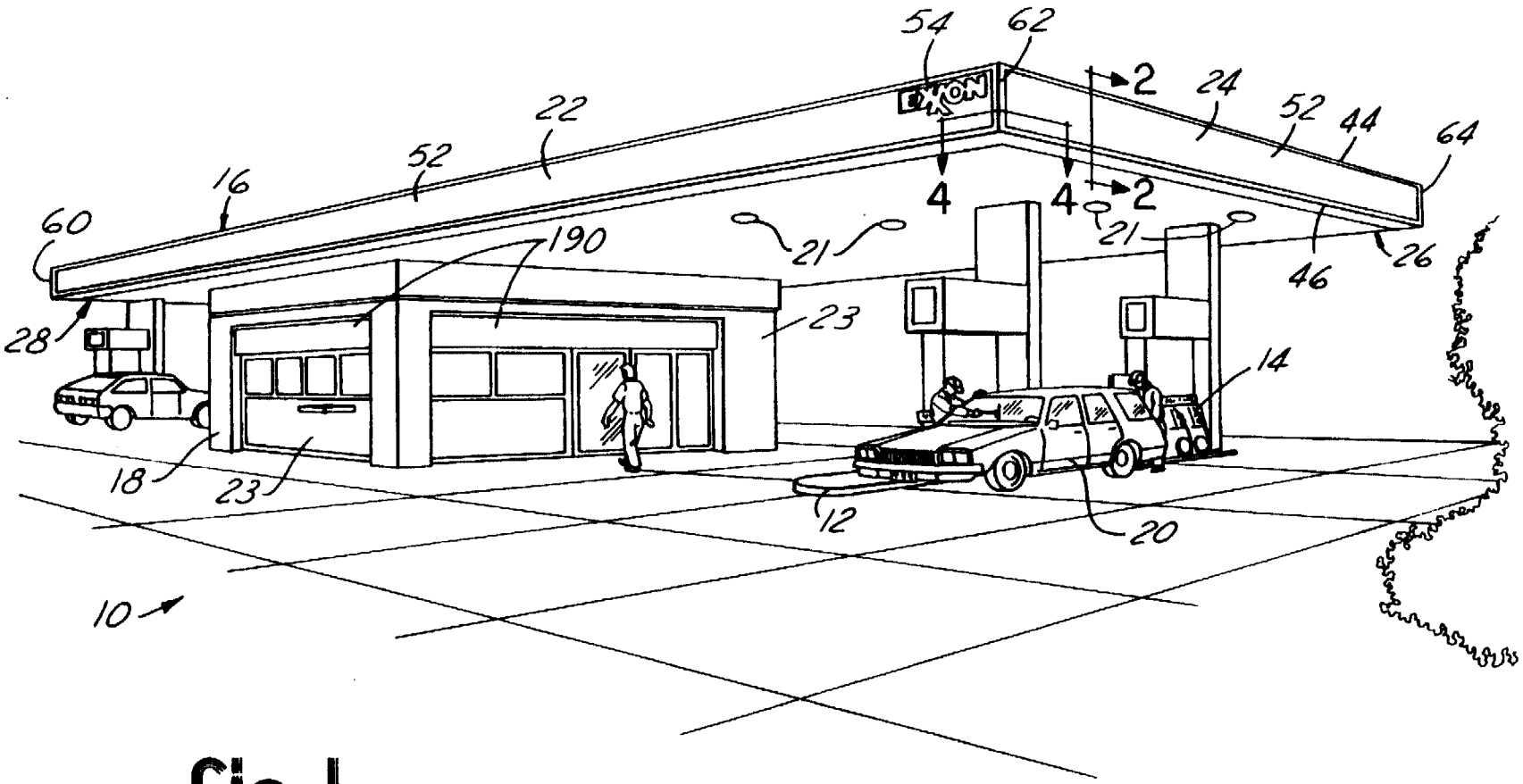
FIG. 1 illustrates the present inventive illuminated canopy and fascia system in use at a service station.

FIGS. 1–5 illustrate the features and advantages of the present inventive illuminated canopy and fascia system. The present invention is particularly suitable for use at gasoline service stations as shown generally by the reference numeral 10 in FIG. 1. As shown, the service station has one or more islands 12 with a number of gasoline pumps 14 positioned on it and the entire area is covered with a canopy 16. A service facility or structure 18 is also provided under the canopies. The canopy covers the area where the vehicles 20 are parked to purchase gasoline. The canopy protects the customers and vehicles from the weather elements and also provides a safe, well-illuminated area for use at night.

Typically, a number of lights 21 are provided on the underside of the canopy 16 which project light downwardly for the customer's benefit. Not only does this allow the customer to use the facilities of the service station in a better manner, but also illuminates the entire service station and plaza area creating a pleasant and safe haven for motorists in nighttime hours. The lighting also allows the service station to be seen by motorists at a considerable distance.

The canopy 16 has fascia areas around its perimeter which are approximately 1–3 feet in height and can be 10–20 feet or more in width. These fascia areas are indicated by the numerals 22, 24, 26 and 28 in FIG. 1. Typically, only the fascia areas which are exposed to passing motorists and are visible from a distance are illuminated. The illumination allows the name of the service station to be highlighted and also can provide reference to some of the services and facilities of the station. Typically, at least two and in most cases three fascia areas of the canopies are illuminated. (The side of the canopy which faces away from the road is usually not illuminated.)

Figure 7:
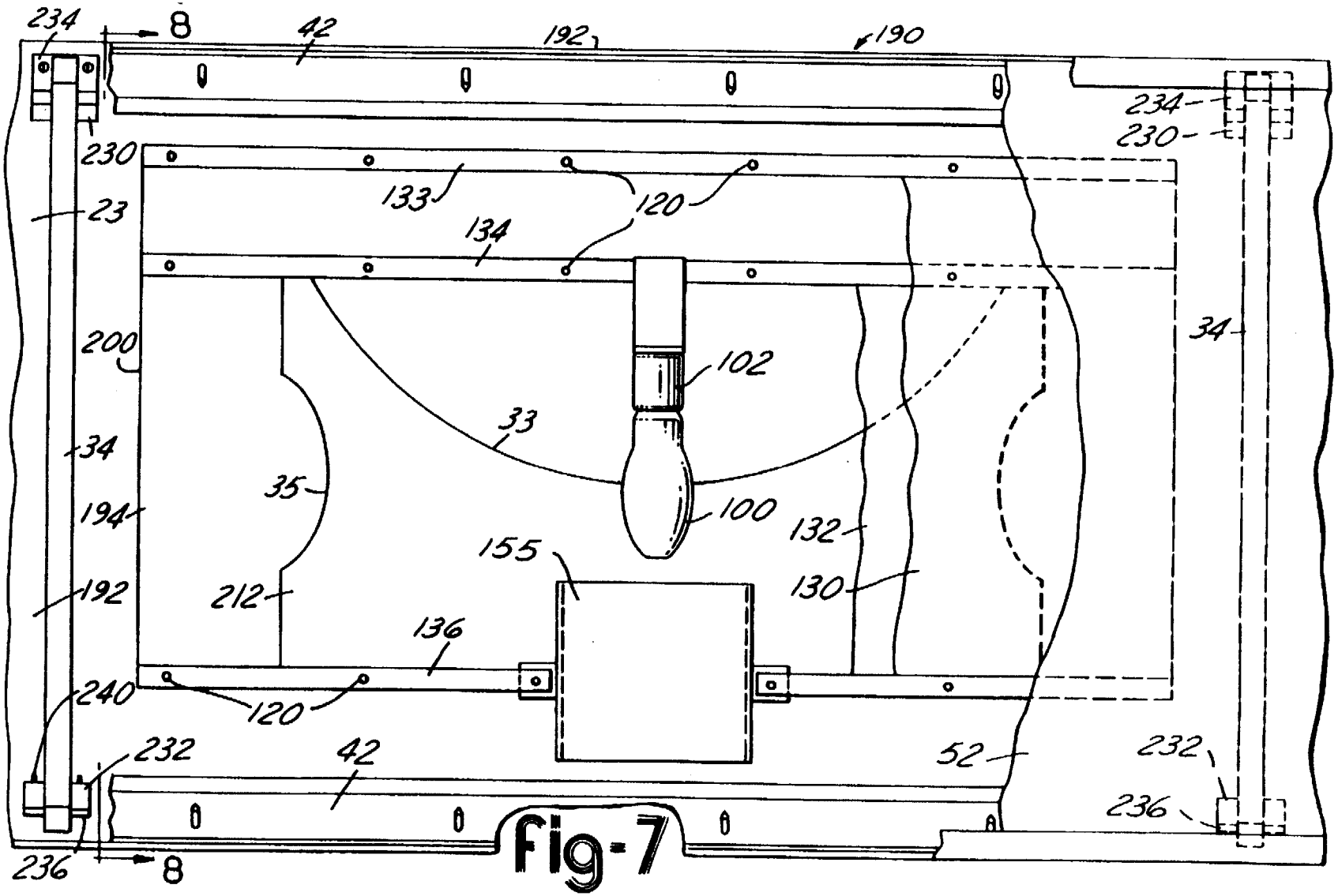
FIG. 7 illustrates in partial cross section the present inventive illuminated wall-mounted system.
Figure 8:
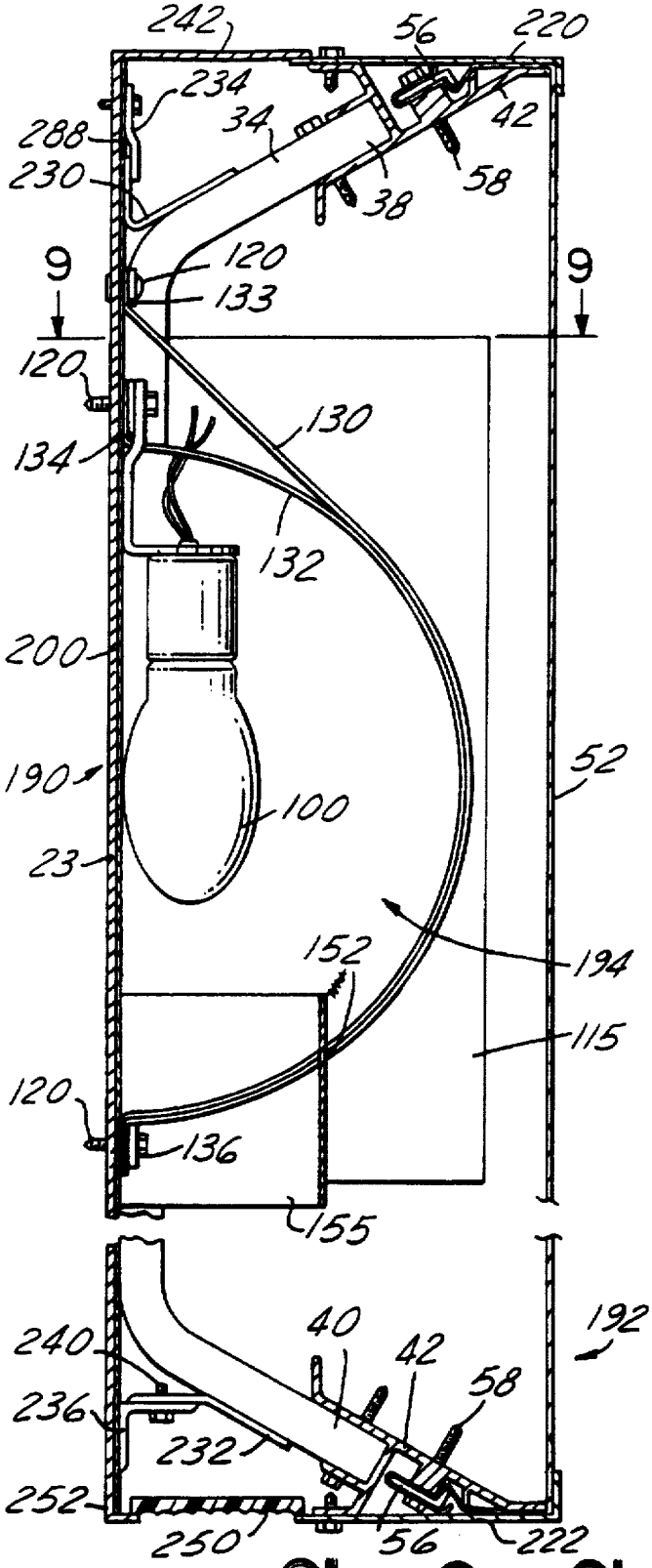
FIG. 8 is a cross-sectional view of the invention of FIG. 7, taken along lines 8—8 and in the direction of the arrows.
Figure 9:
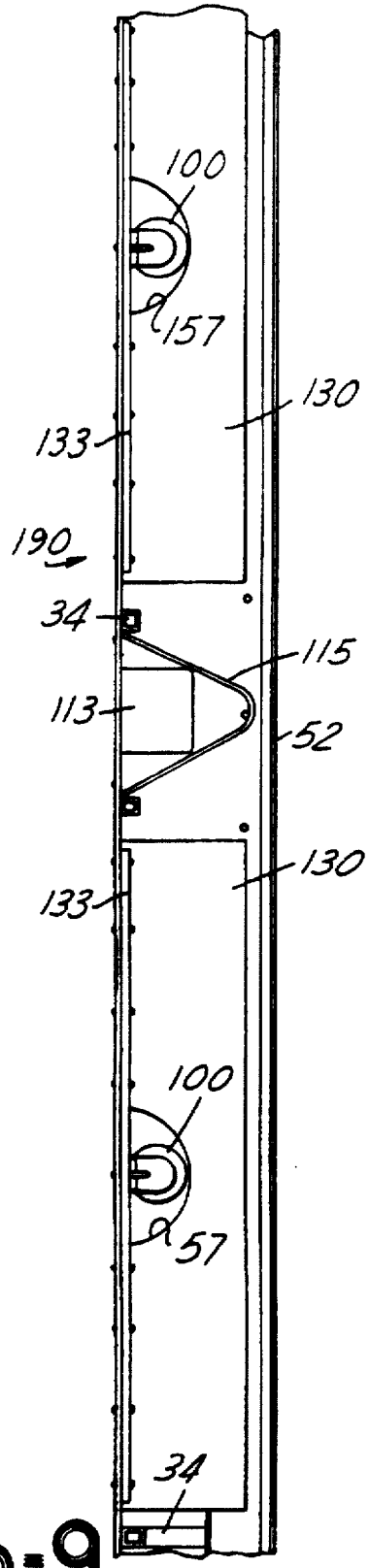
FIG. 9 is a cross-sectional view of the invention of FIG. 7, taken along lines 9—9 and in the direction of the arrows, and showing adjacent light/dispersion systems and accompanying ballast.

The present invention is not limited to canopy and fascia systems, however. It is understood that the present invention could also be used for rear illumination light box structures 190 which can be installed on the walls or surfaces 23 of the building 18 and provide the same highlighted and illuminated names and information that are provided on the canopy fascias described above. In fact, some service stations include an illuminated light box structure on the faces of its buildings over the entrances that are counterparts to the illuminated fascia light box systems on the canopies over the gasoline pumps. One embodiment of the invention designed for use on a wall or other vertical surface is designated by the reference numeral 190 and is discussed infra with reference to FIGS. 7–9.

Figure 2:
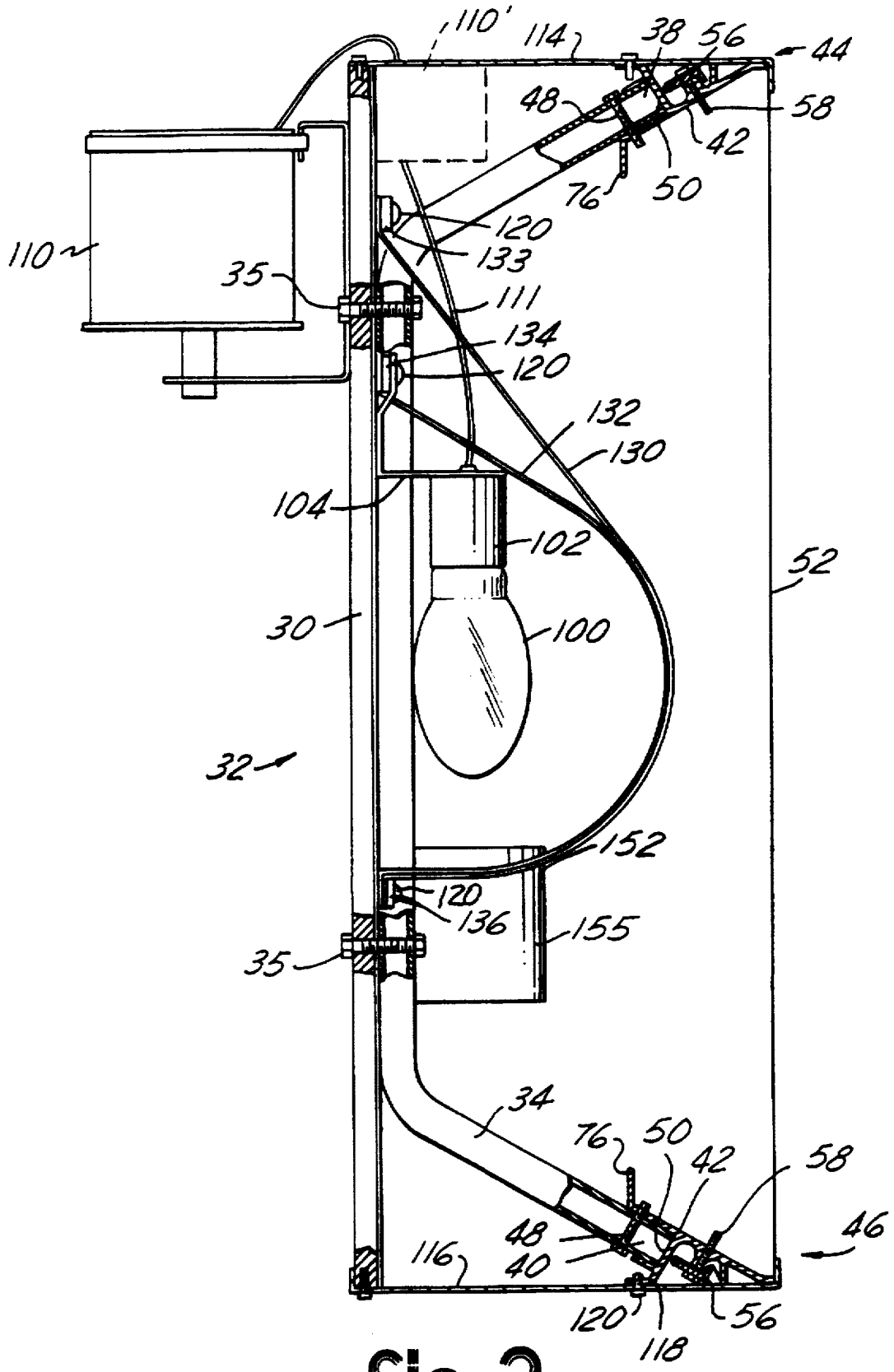
FIG. 2 is a cross-sectional view of the canopy and fascia system as shown in claim 1 when taken in the direction of arrows 2—2 of FIG. 1.

The interior structure and configuration of the inventive light box structure is shown in FIGS. 2–5. The present invention is particularly adapted to be used on existing vertical or fascia structures, such as a wooden fascia board 30 as shown in FIG. 2. In the light box structure 32, a plurality of support brackets or tubes 34 are provided which are bolted or otherwise secured to the existing fascia 30. The support brackets 34 can be steel tubing and can be secured to the fascia system by a plurality of bolts 35 or any other conventional means.

The support brackets 34 are curved U-shaped structures and support elongated fascia frame extrusions 42 at their outer ends 38 and 40. The frame extrusions 42 provide the upper and lower edges of the illuminated fascia apparatus and are represented by reference numerals 44 and 46, respectively. The frame extrusions 42 are made from extruded aluminum in the shape shown in FIGS. 2, 3 and 5 and are attached to the ends 38 and 40 of the support bracket 34 by one or more self-drilling screws 48. The self-drilling screws eliminate drilling of either the frame extrusion or the support bracket at the field site. The extrusion 42 has a recess or channel 50 in which the ends 38 and 40 of the support bracket are positioned. Once the frame extrusions are positioned over a pair of support brackets, the support brackets are positioned in the channels 50 and secured in place with screws 48. The support brackets 34 in turn are secured to the fascia panel 30 and a solid secure unitary structure is formed on the fascia.

Stretched over the front of the light box structure 32 and held in place by the frame extrusions 42, is a translucent, flexible film panel 52. The panel 52 provides the illuminated facing of the fascias 22, 24, etc. of the canopy 16 of FIG. 1. The sign panel 52 preferably is a durable, flexible, translucent material, such as Panaflex 940 from the 3M Company. That material consists of a polyester scrim embedded between two layers of vinyl.

The names and letters 54 (FIG. 1) are preferably applied to the sign panel 52 and comprise a translucent pressure sensitive film. The preferred material in this regard is Scotchcal Series 3630 from the 3M Company. If desired, another protective layer of transparent film can be positioned over the names and numbers 54 for increased protection of the graphics. A graphics protection film provided by 3M under the Scotchcal trade name could be utilized for this purpose.

Figure 5:
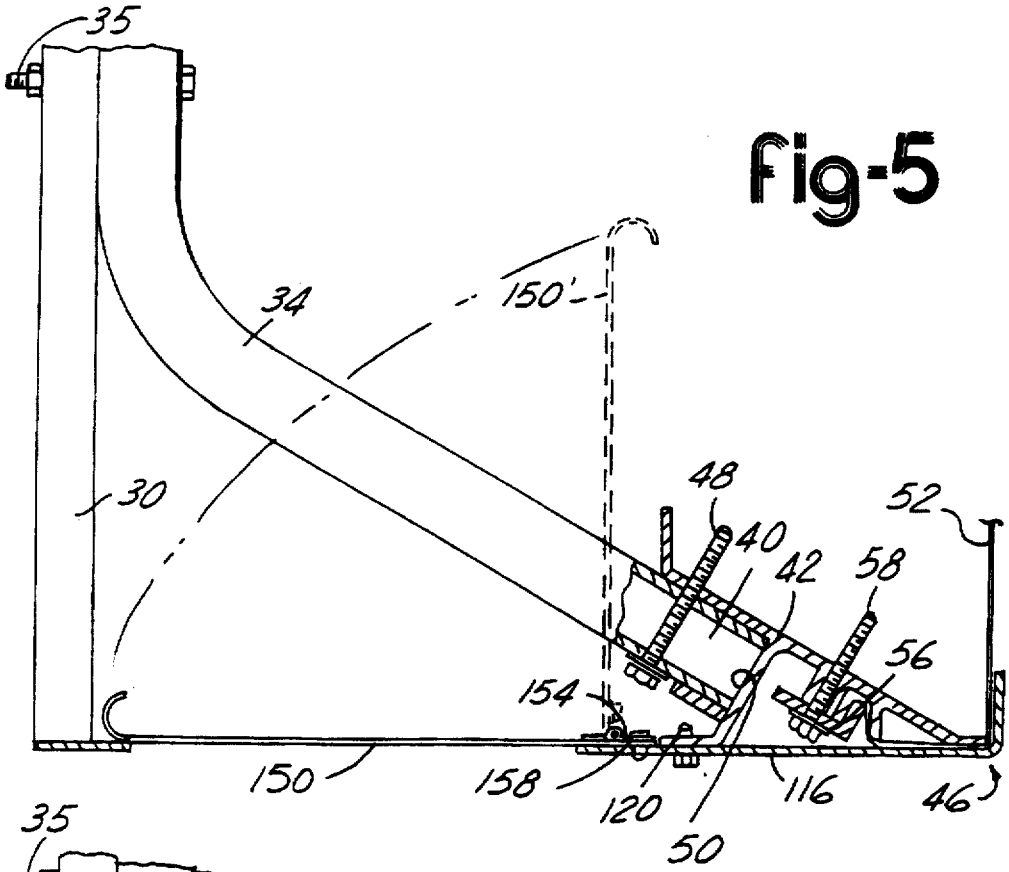
FIG. 5 is a cross-sectional view showing the access door for light source removal, and is taken in the direction of arrows 5—5 of FIG. 3.

The flexible sign panel 52 is stretched over the frame extrusions 42 and held in place as shown in FIGS. 2 and 5 by a tensioner angle extrusion 56. The extrusion 56 is made from extruded aluminum material, extends along the length of the frame extrusion, and is held in place with a plurality of self-drilling screws 58. As shown, the flexible film 52 is wrapped around the angle extrusion 56 so that it is held tightly in place under tension when the screws 58 are installed in place.

The flexible film 52 is also held tightly in place under tension at the shorter ends of the light box. These ends are illustrated by the reference numerals 60, 62 and 64 in FIG. 1; end 62 is shown in detail in FIG. 4. In this regard, the ends of all of adjacent light box structures 32 are tensioned and held in place at the shorter edges in the same manner. Thus, references to light box 32 on one side of the fascia for canopy 16 would apply similarly to the light box structures on the other fascias of the canopy.

The preferred corner structure in accordance with the present invention includes a bent metal support member 70. The corner 72 of the support member protrudes into and forms the corner 62 of the light box structure. The support member 70 is attached at one end 74 to flange 76 on the frame extrusion 42 (see FIG. 2). The second end 78 of the support member 70 is also attached to the flange 76 of the frame extrusion 42. The angle of the support member 70 allows light from the light source, as described below, to reach the corners 62 and still provides a strong solid support for the sign panel 52 at the corner.

Bracket 80 is also attached to the end of the support member 70. Bracket 80 is adapted to hold a tensioning screw 82 and a second tensioning bracket 84. The end 86 of the flexible sign panel 52 in turn is wrapped around a elongated member 88 and secured by a self-drilling screw 90 to the bracket 84. In this manner, when the end 86 of the film 52 is held in place by brackets 88 and 84, the bolt 82 can then be tightened which pulls the film 52 tightly in place in the corner 62.

A shield 92 is secured to the fascia structure 30 and extends outwardly at an angle. The shield is positioned between adjacent lightboxes on a canopy and prevents light from one lightbox from entering an adjacent lightbox. The shield 92 preferably is made from a thin sheet of reflective aluminum material, or is coated with a reflective material.

Figure 3:
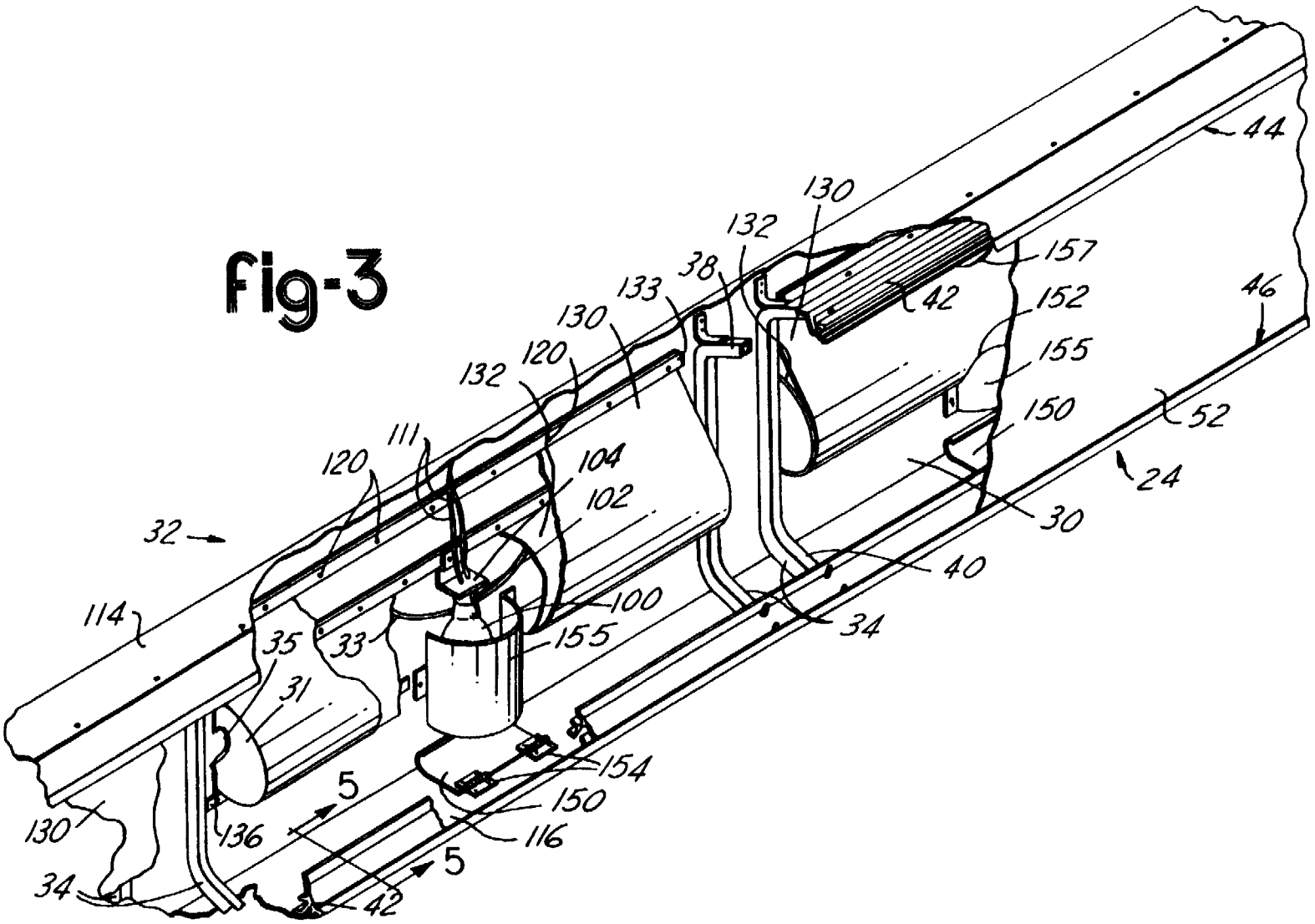
FIG. 3 is a perspective view of the interior of the fascia lightbox apparatus illustrating various features of the invention.

The light source for the illuminated canopy and fascia system is shown in FIGS. 2 and 3. A plurality of metal halide lights (or lamps) 100 are positioned along the fascia panel 30. The lights 100 are screwed into conventional light sockets 102 which are connected to the fascia panel 30 by brackets 104.

The metal halide lights are preferably high intensity discharge (HID) lights. These are more efficient and provide more lumens per watt of energy than regular light bulbs. Preferably, metal halide lamps of 150–175 watts are utilized for the illuminated canopy and fascia system. With lights of this intensity, the lamps 100 can be provided every five to nine feet along the length of the fascia, and preferably every 8 feet. The spacing of the lights provides for better energy consumption and light output. Not only do the metal halide HID lights 100 provide a more efficient light source for a canopy and fascia system, but the individual light bulbs are easier to service and replace, as explained below.

It is also possible in accordance with the present invention to use light sources other than metal halide lamps to provide the necessary illumination. Such light sources could be conventional incandescent lamps, mercury vapor lamps, other HID lamps, although a point light source is necessary. Metal halide lights are preferred due to their color temperature properties.

In order to reduce operation and replacement costs, the sizes of the light sources should be kept as small as possible. In this regard, a balance might need to be made between the spacing and size of the light sources which would provide the desired illumination intensity and distribution, and which also would minimize operating and replacement costs.

One or more ballasts 110 are provided for the metal halide lights. The size and number of ballasts will depend on the sizes and number of light sources utilized and the illumination intensity desired on the sign panel 52. The ballasts are of a conventional type and do not need further explanation or description here. A ballast can be provided on the opposite side of the fascia panel 30 from the lights 100 if there is sufficient space (as shown in FIG. 2), or the ballast can be positioned internally along an inside edge of the light box (as shown by phantom lines 110' in FIG. 2). Conventional wiring 111 is used to connect the lights to the ballasts and the ballasts in turn to a plug or power source (not shown).

If necessary to minimize shadows and provide better light distribution on the face of the film 52, the angle or positioning of the lights 100 relative to the fascia 30 can be changed or adjusted as desired. For example, the lights 100 could be set at horizontal or vertical angles relative to the fascia to eliminate shadows caused by support brackets, ballasts or other internal structures.

A pair of elongated aluminum trim caps are provided to enclose the interior of the light box apparatus. The trim caps comprise an upper panel member 114 and a lower panel member 116. The caps can be attached to the ends of the fascia panel 30 when needed as well as to a flange 118 on the fascia extrusions 42. The connection of the top and bottom trim caps 114 and 116 to the fascia panel and frame extrusions 42 can be with any conventional means, such as self-drilling screws 120.

A light dispersion panel 130 is provided around each of the metal halide light sources 100. Panel 130 distributes the light uniformly on the inside surface of the sign panel 52. Preferably, the light dispersion panel 130 is the Varilume patterned film product produced by TIR Systems Ltd. in British Columbia, Canada. The Varilume film product has a plurality of openings on the face of the film, the openings being sized and arranged in a certain pattern designed for allowing differing amounts of light to pass through the film at different areas.

Another method for diffusing illumination from light sources and spreading it evenly over a surface is shown and described in U.S. Pat. No. 4,267,489.

The light dispersion panels 130 are formed as curved structures around each of the light sources 100 and positioned between the light sources and the flexible front panel 52. To keep the film 130 in position and prevent it from sagging and thus changing the light dispersion pattern, a curved support member 132 is provided. The support member 132 can be made of any conventional clear plastic material which satisfies the functions and purposes of the present invention, but preferably is a clear polycarbonate material approximately 0.030 inches in thickness.

Both the film 130 and support members 132 are connected to the fascia panel 30 by elongated rigid strip members 133, 134 and 136. The elongated edges of the film and support members are bent (e.g. by an angle break) to provide a flat portion adjacent the strip members. Self-drilling screws 120 are positioned through the film, support members and strip members and used to secure the film and support members to the fascia. The strip members should have a low profile to eliminate shadows or light blockages which might affect the light distribution on the sign panel.

In order to increase the evenness and intensity of the light distribution on the front panel 52, a specular reflective surface 31 is provided on the fascia 30 behind the light sources 100. The surface 31 could be coated with a highly reflective paint (such as white), or a type of mirrored specular reflector could be provided (such as bright aluminum reflector film). Also, in order to minimize shadows caused by the light sockets 102, a curved half-moon portion 33 of the fascia immediately behind the light sockets is left uncovered by the specular reflective surface. Similarly, curved surfaces 35 are provided in the ends of the reflective surface to provide a more uniform light dispersion pattern on the front panel.

Figure 4:
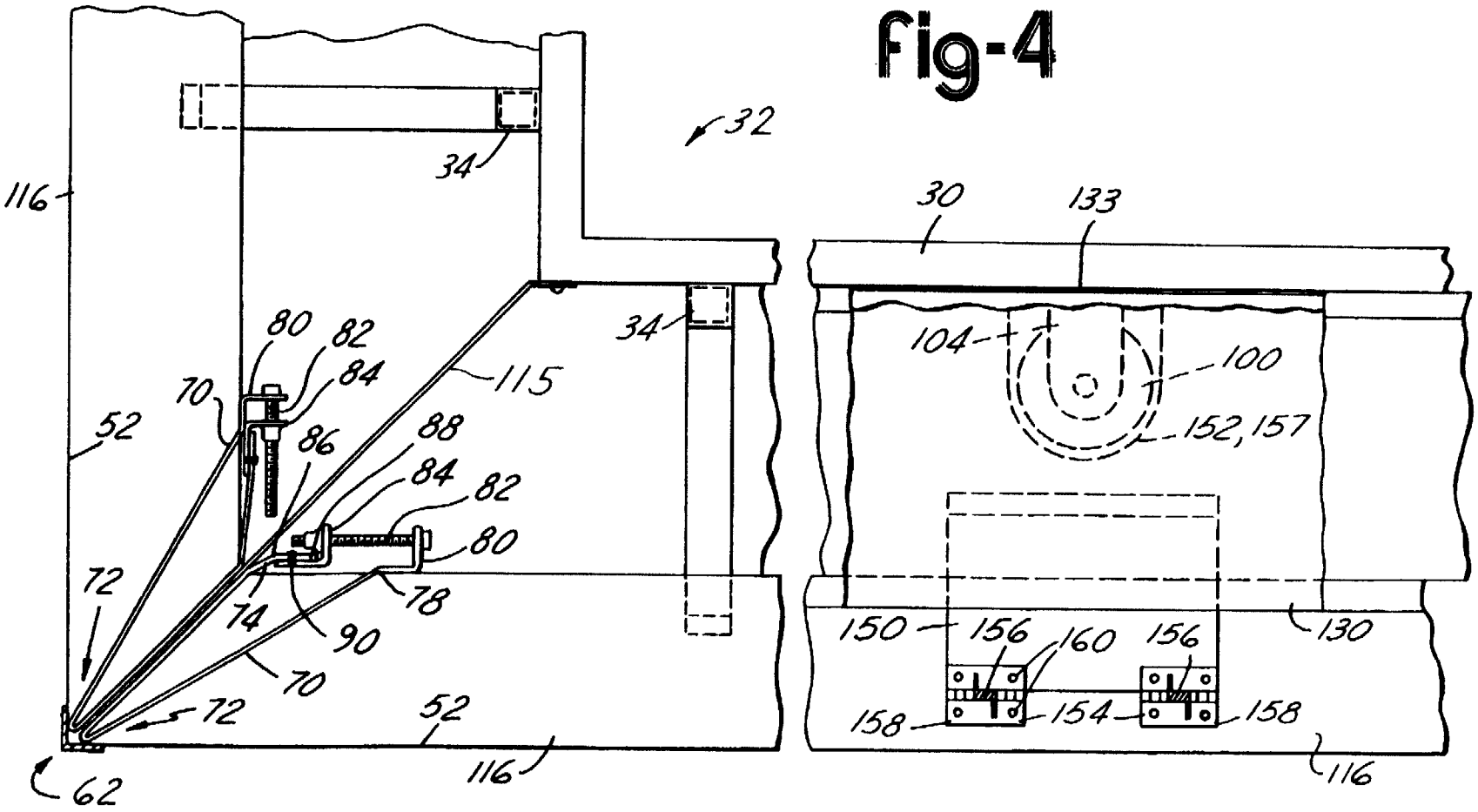
FIG. 4 is a cross-sectional view illustrating the inventive corner assembly of the present invention.

One of the features of the invention is that the lights 100 can be easily and quickly replaced when they burn out. For this purpose, a hinged access door 150 is provided in the bottom 116 of the fascia, and a curved opening or cutout 152 is provided in the light dispersion panel 130 and in the curved backing member 132. These are shown in FIGS. 3–5.

An access door 150 and opening 152 are provided in axial alignment with each of the metal halide lights 100 (as shown in FIG. 3). The access door 150 is connected by hinges 154 so it can be opened to position 150' (shown in phantom in FIG. 5). The hinge plates 158 pivotably attached to the door 150 are attached to trim cap member 116 and door 150 by pop rivets 160. Preferably, a conventional biasing spring 156 is provided in the hinges 154 so that the door 150 will automatically return to its closed position after the light bulb has been replaced. In this manner, the light bulb can be replaced from the ground with an elongated pole device which can be inserted manually up through the door 150 and the door will return to its closed position after the pole and light bulb are removed.

Pole type light bulb replacement devices with spring biased fingers and the like which are used to grip a light bulb so it can be unscrewed and removed are conventionally known and available. Of course, other types of light bulb removing devices and configurations of access openings through the fascia structure can be utilized in accordance with the scope of the present invention.

A sleeve 155 is positioned in the opening 152 to facilitate replacement of the light bulb without damaging the film 130 and support members 132. The sleeve 155 preferably is a U-shaped member made of aluminum and is connected to the fascia 30 by screws or other conventional fasteners. The sleeve 155 also prevents formation of a shadow pattern on the front panel caused by the edges of the opening 152.

Although a cutout 152 access opening is preferably provided in the panel 130 and backing member 132 for removal and replacement of the lights 100, it is also possible in the alternative to have the bottom edges of the panel 130 and backing member 132 be removably attached to the fascia 30. In this manner, when a light 100 needed replacement, access through door 150 and detachment of panel 130 and backing member 132 from the fascia could also be easily and conveniently made.

A cutout opening 157 is preferably provided in the panel 130 and backing member 132 above the light source for temperature control or relief. This opening 157 may not be necessary in all cases, and depends on the intensity of the light source and the power provided.

Figure 6:
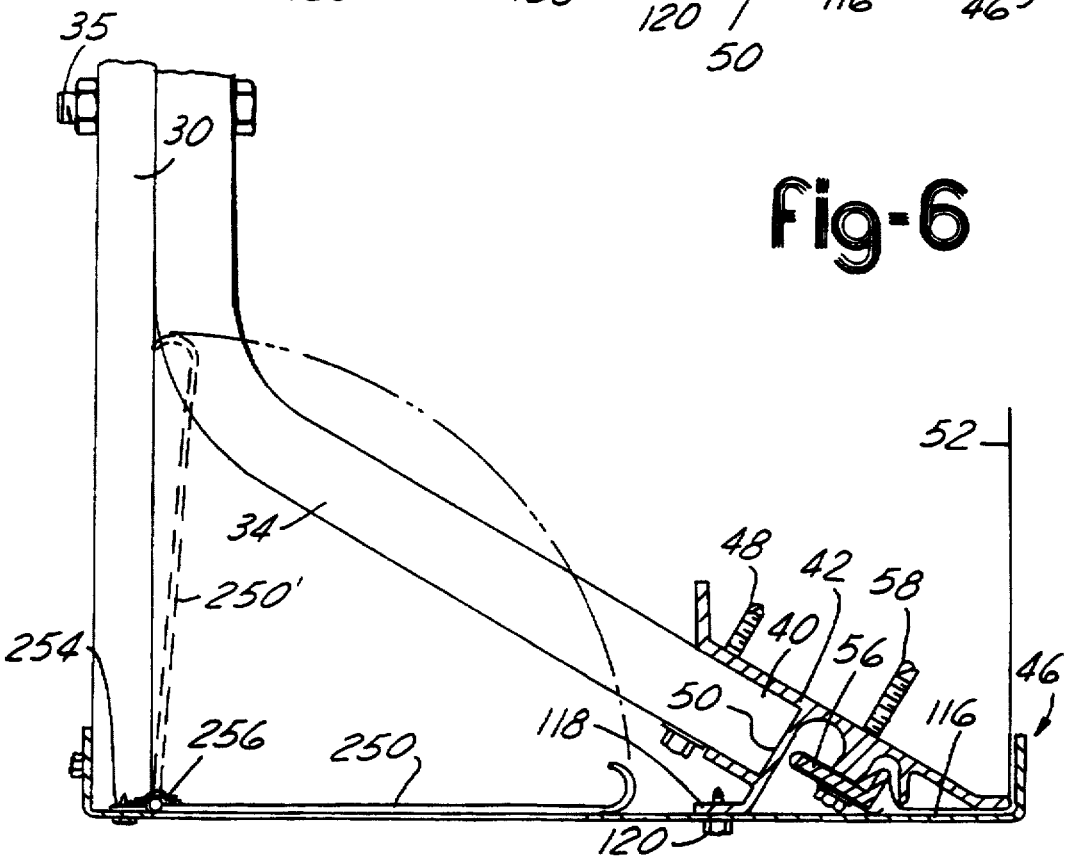
FIG. 6 illustrates an alternate access door embodiment.

FIG. 6 shows an alternate embodiment of an access door 250. In this embodiment, the door 250 is pivoted around pivot pins or hinges 254 and opens in the opposite direction to door 150 shown in FIG. 5. Preferably, door 250 is biased by spring 256 to its closed position.

Wall-mounted lightboxes 190 in accordance with the present invention are shown in FIGS. 1 and 7–9. These structures contain many of the basic concepts and features of the invention as described above, but is modified for mounting on the walls or other surfaces 23 of the building 18. The lightbox 190 includes an exterior housing 192 and a light/dispersion film system 194. Typically, the light/dispersion film system is first installed in place on the building and then the housing 192 is installed in place covering and enclosing the light/dispersion film system.

The light/dispersion film system 194 includes one or more metal halide lights (or lamps) 100 of the type and nature described above with reference to FIGS. 1–5. The lights 100 are installed in conventional sockets 102 which are affixed to the building surface 23 and powered by a convention ballast 113. The ballast is positioned between two adjacent light/dispersion systems and placed within a cover member 115 (see FIGS. 8 and 9).

The lights 100 are positioned behind light dispersion film 130 and covered support member 132. The film 130 and support member 132 are separately connected to the building surface 23 at their upper ends by elongated strip members 133 and 134. The edges of the film and support members are bent in the configurations shown for this purpose. Fasteners, such as self-drilling screws 120, are used to connect the strip members to the building surface.

The lower edges of the film 130 and support members 132 are connected together and secured to the building by strip member 136. Alternately, the lower edges of the film and support member can be connected together by an L-shaped bracket (not shown) which is adapted to fit in a channel in a corresponding bracket attached to the building in much the same manner as the angled bracket 230 fits in the channel 288 of bracket 234 as discussed below and shown in FIG. 8. In this manner, the lower edges of the film and support member could be selectively connected from the building when it was desired to change the light 100.

The film 130, support member 132, and brackets 133, 134 and 136 are preferably about 5–6 feet in length and are mounted as a group on the building or other wall surface 23 as shown in the drawings. Preferably, for ease of installation on site at the building, the film 130, support member 132, brackets 133, 134, and 136, and light socket 102 are premounted at the factory or off-site on a separate metal sheet or panel 200. Then, at the building site, the panel 200 with these items mounted on it is installed in place as a modular unit or system.

A specular reflector member 212 is preferably positioned on the surface 23 or panel 200 behind the lights 100—in the same manner and for the same reasons as discussed earlier. Preferably the reflector member is highly specular and reflects a minimum of 90% of the light. The member 212 also preferably has a curved portion 33 ("half-moon" shaped) behind the upper part of the light, as well as curved portions 35 at each end of the reflector member, as discussed above, which are not reflective for better light dispersion.

Preferably, a cut-out opening 152 is provided in the lower portions of the light dispersion panel 130 and support member 132 for removal of the light (as described above), rather than providing selectively detachable bracket members. Sleeve members 155 are also provided in the cut-out opening for the purposes and reasons as described above.

The exterior housing 192 of the wall-mounted unit 190 is preferably assembled or a separate modular unit and then installed in place on the surface 23 after the light/dispersion film system 194 is affixed to the surface 23.

The housing 192 includes a pair of U-shaped support brackets 34 and a pair of elongated frame extrusion members 42 which are mounted to the outer ends 38 and 40 of the brackets 34. As in the fascia lightbox embodiment described above with reference to FIGS. 1–5, the flame extrusions 42 are made from extruded aluminum in the configuration shown and provide the upper and lower edges of the lightbox.

A translucent, flexible film panel 52 is stretched over the frame extrusions 42 and held in place by angle extrusion 56 and screws 58. The panel 52 provides the surface for advertising or informational messages desired by the business establishment.

Preferably, the support brackets 34, frame extrusions 42, film panel 52 and panel members 220 and 222 are assembled together as a separate modular unit (although they could be mounted and installed separately on the building surface 23 if desired). In order to install the modular housing 192 on the building or other wall surface, corresponding sets of brackets are provided. Angled brackets 230 and 232 are mounted on the upper and lower portions of the support brackets 34. Clip bracket 234 and rest bracket 236 are mounted on the wall or building surface 23. When the modular housing 192 is installed, the brackets 230 are nested within channels 288 in clip brackets 234, and then the brackets 232 are positioned on rest bracket 236. Thereafter, brackets 232 and 236 are secured together by fasteners, such as self-drilling screws 240.

In order to complete the exterior housing structure for the lightbox 190, elongated panel member 242 is secured to the building surface and mates with the panel member 220. Conventional end caps or panels are provided made from aluminum sheet material or the like are provided on the two side ends of the lightbox (not shown).

On the lower surface of the lightbox 190, one or more elongated clear glass or plastic panels 250 are provided. The panels 250 are supported by panel member 222 and bracket 252 attached to the building and allows illumination from the light 100 to project downwardly from the lightbox 190 on the building or wall surface.

Also, in order to change the light 100, the panels 250 can be easily lifted or removed so that a hand or tool can be extended upwardly between the bracket 252 and panel member 222.

Although particular embodiments of the present invention have been illustrated in the accompanying drawings and described in the foregoing detailed description, it is to be understood that the present invention is not to be limited to just the embodiments disclosed, but that they are capable of numerous rearrangements, modifications and substitutions without departing from the scope of the claims hereafter.

What is claimed is:

1. An illuminated fascia light box apparatus for mounting on a surface comprising:

a plurality of support brackets for attachment to said surface;

a pair of elongated frame members attached to said support brackets and forming two external face edges of said apparatus;

a pair of corner members, a first corner member attached to one end of said pair of frame members and a second corner member attached to the other end of said pair of frame members;

a translucent sheet member stretchably extending and secured at its edges by said pair of frame members and said pair of corner members;

at least one metal halide light positioned in said apparatus and providing illumination through said translucent sheet member;

a light dispersion member positioned between said light and said sheet member for distributing illumination from the light uniformly on said sheet member;

wherein said light dispersion member includes a means for manually accessing said light from below said light box for replacement.

2. The illuminated fascia light box apparatus of claim 1 wherein said frame members have channel means for containing ends of said support brackets therein.

3. The illuminated fascia light box apparatus of claim 1 further comprising a support member for supporting said light dispersion member.

4. The illuminated fascia light box apparatus of claim 1 wherein said light dispersion member is curved.

5. The illuminated fascia light box apparatus of claim 1 wherein said means for manually accessing said light comprises an opening in said light dispersion member.

6. The illuminated fascia light box apparatus of claim 1 further comprising an access door in said apparatus adjacent said light so that said light can be removed and replaced.

7. The illuminated fascia light box apparatus of claim 6 wherein said access door is hinged and spring biased to the closed position.

8. The illuminated fascia light box apparatus of claim 3 wherein said support member is curved and made from a polycarbonate material.

9. The illuminated fascia light box apparatus of claim 1 wherein said sheet member has a design thereon which is highlighted when the light is illuminated.

10. The illuminated fascia light box apparatus of claim 1 wherein at least two light box apparatus are provided on the fascia of a service station canopy.

11. The illuminated fascia light box apparatus of claim 2 further comprising self-drilling fastener means for securing said frame members to said support brackets.

12. The illuminated fascia light box assembly of claim 1 wherein said corner members comprise a bent piece of spring material and at least one tensioning means for tensioning said sheet material.

13. An illuminated system comprising:

a housing;

an elongated flexible translucent sheet means positioned on and stretched across at least one elongated side of said housing;

a point light source in said housing for projecting light;

light dispersion means for distributing light from said point light source uniformly on said elongated translucent sheet means; and access means on said housing for accessing said point light source in said housing;

said light dispersion means being a patterned film member having a plurality of light openings arranged in a prespecified pattern to allow differing amounts of light to pass through the film at different areas and thereby create a uniform distribution of light on all portions of the translucent sheet means.

14. The illuminated system of claim 13 further comprising support means for supporting said light dispersion means.

15. The illuminated system of claim 13 wherein said point light source comprises metal halide light means.

16. An illumination system comprising:

a housing and light dispersion means;

said housing having an upper surface, a lower surface and at least one side surface;

a flexible translucent sheet member secured to one of said side surfaces of said housing and stretched across said surface;

means for holding said light dispersion means within said housing;

said light dispersion means comprising at least one point light source illumination means, and light dispersion sheet means for uniformly distributing light from each said at least one point light source illumination means on said translucent sheet means; and access means in said lower surface of said housing for replacing each said point light source illumination means *from below and outside said housing.*

17. The invention as defined in claim 16 wherein said translucent sheet member is held on said housing by elongated frame members.

18. The invention as defined in claim 17 wherein said translucent sheet member is stretched across said frame members.

19. The invention as defined in claim 16 wherein said point light source illumination means comprises a bulb and a socket.

20. The invention as defined in claim 19 wherein said socket opens vertically downward.

21. The invention as defined in claim 16 wherein said light dispersion sheet means comprises an apertured sheet.

22. The invention as defined in claim 21 wherein said light dispersion sheet means includes a reflective surface facing said point source light.

23. The invention as defined in claim 16 wherein said light dispersion sheet means comprises a curved sheet.

24. The invention as defined in claim 22 wherein said reflective surface faces a second reflective surface behind said point source light.

25. The invention as defined in claim 19 wherein a reflective surface faces toward said dispersion means behind said socket and said reflective surface includes at least one cut out in registration with said socket.

26. The invention as defined in claim 16 wherein said housing includes at least one reflective interior surface to reduce shadowing from each said point source light.

27. The invention as defined in claim 16 wherein said light dispersion sheet means includes access means for manually accessing said point source illumination means.

28. The invention as defined in claim 27 wherein said access means comprises a displaceable light dispersion sheet means.

29. The invention as defined in claim 27 wherein said access means comprises an opening in said light dispersion sheet means.

30. The invention as defined in claim 29 and further comprising a sleeve around the opening to protect the light dispersion sheet means and reduce shadowing.

31. The invention as defined in claim [27] *16* wherein said at least one point light source comprises a bulb and a socket opening downwardly from said housing, and wherein said [housing includes] *access means comprises* an opening and a pivoting door in registration with said socket.

32. The invention as defined in claim 21 wherein said light dispersion sheet means comprises a film.

33. The invention as defined in claim 32 wherein said film is contoured.

34. The invention as defined in claim 33 wherein said film overlays a rigid configured support member.

35. An internally illuminated sign comprising:

an elongated housing bounded by upper and lower elongated sides, said housing having a rear panel and an open front portion, an elongated flexible planar translucent panel covering said open front portion, at least one point light source positioned adjacent said rear panel and located in said housing substantially centrally between said upper and lower elongated sides, [and]

a light dispersion sheet positioned between said point light source and said translucent panel for distributing light from said point light source uniformly over at least an elongated portion of said translucent panel and between said upper and lower elongated sides, said housing further comprising a plurality of support brackets attached to said rear panel, a pair of elongated frame members attached to said support brackets and forming elongated edges on said elongated sides, and said translucent panel being mounted on said frame members and stretched therebetween, *and*

*access means in said lower elongated side for replacing said point light source from below and outside said housing.*

36. The internally illuminated sign of claim 35 further comprising a pair of end frame members positioned at the ends of said elongated housing and attached to said elongated frame members, said translucent panel having two elongated side edges and two end edges, and said end frame members mounting and stretching the end edges of said translucent panel.

37. The internally illuminated sign of claim 35 wherein said light dispersion sheet has a curved configuration.

38. The internally illuminated sign of claim 35 wherein said light dispersion sheet has a plurality of openings, said openings being sized and arranged in a pre-specified pattern in order to allow differing amounts of light from said point light source to pass through said sheet at different areas and achieve said uniform distribution of light.

39. The internally illuminated sign of claim 35 wherein at least two point light sources are provided, said light sources being spaced uniformly along said rear panel, each said light source having a light dispersion sheet positioned between said light source and said translucent panel, whereby light from said at least two point light sources is distributed uniformly over the entire elongated translucent panel.

[40. The internally illuminated sign of claim 35 further comprising access means in one of said elongated sides of said housing for replacing each of said point light sources.]

41. The internally illuminated sign of claim [40] *35* wherein said access means is positioned in said lower elongated side in order to provide access to said point light source from the ground.

42. The internally illuminated sign of claim 41 wherein said access means comprises a door.

43. The internally illuminated sign of claim 42 wherein said door is movable between an open position allowing access to said light sources and a closed position preventing access to said light sources, and further comprising biasing means for biasing said door to its closed position.

44. The internally illuminated sign of claim 37 further including means for manually accessing said point light source through said light dispersion sheet.

45. The internally illuminated sign of claim 44 wherein said means for manually accessing said point light source comprises an opening in said light dispersion sheet.

46. The internally illuminated sign of claim 44 wherein said light dispersion sheet is attached to said rear panel and said means for manually accessing said point light source comprises detachable means for selectively detaching said light dispersion sheet from said rear panel.

47. The internally illuminated sign of claim 41 wherein said access means comprises a removable translucent panel member.

48. The internally illuminated sign of claim 35 further comprising a reflective surface on said rear panel.

49. The internally illuminated sign of claim 35 wherein said light dispersion sheet has a reflective surface on the side facing said point light source.

50. An internally illuminated lightbox comprising:

an elongated housing, said housing having an upper elongated panel member, a lower elongated panel member, a rear panel member, and an open front portion, an elongated flexible planar translucent sheet member stretched over and covering said open front portion, said translucent sheet member having a length in its elongated direction and a width laterally to said elongated direction, a plurality of point light sources in said housing, said light sources positioned uniformly in a spaced apart relationship on said rear panel member and substantially centrally between said upper elongated panel member and said lower elongated panel member, [and]

light dispersion sheet means positioned between each of said point light sources and said translucent sheet member, whereby light from said point light sources is distributed uniformly over the entire width and length of said elongated translucent sheet member, *and*

*access means in said lower elongated panel member for replacing each of said plurality of point light sources from below and outside said housing.*

51. The internally illuminated sign of claim 50 wherein said light dispersion sheet means comprises a plurality of individual dispersion panel members.

52. The internally illuminated sign of claim 50 wherein said light dispersion sheet means has a curved configuration.

53. The internally illuminated sign of claim 52 further comprising access means in said dispersion sheet means for replacing said point light sources.

[54. The internally illuminated sign of claim 50 further comprising access means in said lower elongated panel member for replacing said point light sources.]

55. The internally illuminated sign of claim [54] *50* wherein said access means comprises a plurality of spring biased access doors.

56. The internally illuminated sign of claim 50 further comprising a reflective surface on said rear panel.

57. The internally illuminated sign of claim 50 wherein said light dispersion sheet means has a reflective surface on the side facing said point light sources.

58. The internally illuminated sign of claim 50 wherein said light dispersion sheet means has a plurality of openings therein across the surface of said sheet means, said openings being sized and arranged in a prespecified pattern to allow differing amounts of light from said point light source to pass through said sheet means at different areas along the length and width of said sheet means and thereby achieve said uniform distribution of light.

59. An internally illuminated sign comprising:

an elongated housing means substantially rectangular in shape and bounded by upper and lower elongated sides and a pair of shorter end members, said housing having a rear member and an open front portion and being greater than ten feet in length, an elongated flexible planar translucent panel member stretched over and covering said open front portion, at least two point light sources positioned in said housing and providing illumination for said translucent panel member, said point light sources being spaced between five to nine feet apart, light dispersion sheet means positioned in said housing between said point light sources and said translucent panel member, said light dispersion sheet means having a plurality of light openings arranged in prespecified patterns adjacent each of said point light sources to allow differing amounts of light to pass through the sheet means at different areas, whereby a light pattern of substantially uniform intensity is created along and across the entire translucent panel member.

60. The illuminated sign as set forth in claim 59 further comprising frame members positioned substantially around the perimeter of said open front portion and wherein said translucent panel member is stretched over said frame members.

61. The illuminated sign as set forth in claim 59 further comprising access means in said lower elongated side of said housing for providing access to replace said point light sources.

62. The illuminated sign as set forth in claim 59 wherein said point light sources each comprise metal halide lights.

63. The illuminated sign as set forth in claim 59 further comprising a specular reflective means on said rear member of said housing, said specular reflective means being at least 90% light reflective.

64. The illuminated sign as set forth in claim 59 wherein said internally illuminated sign comprises a canopy fascia device.

65. The illuminated sign as set forth in claim 59 wherein said internally illuminated sign comprises a wall mounted lightbox device.

66. An internally illuminated sign comprising:

an elongated housing bounded by upper and lower elongated sides, said housing having a rear panel and an open front portion, an elongated flexible translucent panel covering said open front portion, at least one point light source positioned adjacent said rear panel and located in said housing a light dispersion sheet positioned between said point light source and said translucent panel for distributing light from said point light source uniformly over at least an elongated portion of said translucent panel and between said upper and lower elongated sides, [and]

a frame means positioned around the edges of said open front portion, said translucent panel being mounted on said frame means and stretched thereon, *and*

*access door means in said lower elongated side for replacing said point light source from below and outside said housing.*

67. An illuminated system for mounting on a surface comprising:

a housing, said housing having an upper surface, a lower surface and at least one side surface;

mounting means attaching said housing to said surface;

a flexible translucent sheet member secured on one of said side surfaces of said housing;

light dispersion means in said housing;

means for supporting said light dispersion means within said housing;

said light dispersion means comprising at least one point source illumination means, and light dispersion sheet means for uniformly distributing light from each said at least one point source illumination means on said translucent sheet means;

access means in said lower surface of said housing for replacing each said point source illumination means;

wherein said translucent sheet member is held on said housing by elongated frame members; and wherein said translucent sheet member is stretched across said frame members.

68. An illuminated system for mounting on a surface comprising:

a housing and light dispersion means;

said housing having an upper surface, a lower surface and an least one side surface;

a mount attaching said housing to said surface;

a translucent sheet member secured on one of said side surfaces of said housing;

means for supporting said light dispersion means within said housing;

said light dispersion means comprising at least one point light source illumination means, and light dispersion sheet means for uniformly distributing light from each said at least one point light source illumination means on said translucent sheet means; and access means in said lower surface of said housing for replacing each said point light source illumination means;

wherein said light dispersion sheet means comprises an apertured sheet and has a reflective surface facing said point light source.

69. An internally illuminated sign comprising:

an elongated housing bounded by upper and lower elongated sides, said housing having a rear panel and an open front portion, an elongated planar translucent panel covering said open front portion, at least one point light source positioned adjacent said rear panel and located in said housing substantially centrally between said upper and lower elongated sides, a light dispersion sheet positioned between said point light source and said translucent panel for distributing light from said point light source uniformly over at least an elongated portion of said translucent panel and between said upper and lower elongated sides, access door means in said lower elongated side of said housing for replacing each of said point light sources from the ground, said access door means being movable between an open position allowing access to said light sources and a closed position preventing access to said light sources, and biasing means for biasing said access door means to the closed position.

70. An internally illuminated lightbox comprising:

an elongated housing, said housing having an upper elongated panel member, a lower elongated panel member, a rear panel member, and an open front portion, an elongated planar translucent sheet member covering said open front portion, said translucent sheet member having a length in its elongated direction and a width laterally to said elongated direction, a plurality of point light sources in said housing, said light sources positioned uniformly in a spaced apart relationship on said rear panel member and substantially centrally between said upper elongated panel member and said lower elongated panel member, light dispersion sheet means positioned between each of said point light sources and said translucent sheet member, whereby light from said point light sources is distributed uniformly over the entire width and length of aid elongated translucent sheet member, and access means in said lower elongated panel member for replacing said point light sources, said access means comprising a plurality of spring biased access doors.

71. An illuminated system for mounting on a surface comprising:

a housing and light dispersion means;

said housing having an upper surface, a lower surface and at least one side surface;

a mount attaching said housing to said surface;

a translucent sheet member secured on one of said side surfaces of said housing;

means for supporting said light dispersion means within said housing, said light dispersion means comprising at least one point light source illumination means, and light dispersion sheet means for uniformly distributing light from each said at least one point light source illumination means on said translucent sheet member;

access means in said lower surface of said housing for replacing each said point source illumination means;

an opening in said light dispersion sheet means for manually accessing said point light source illumination means; and a sleeve around said opening to protect said light dispersion sheet means and reduce shadowing.

* * * * *